United States Patent
Matsuura

(10) Patent No.: US 10,126,594 B2
(45) Date of Patent: Nov. 13, 2018

(54) TRI-COLOR LED GROUPS SPACED FOR OPTIMAL COLOR MIXING

(71) Applicant: CANON KABUSHIKI KAISHA, Tokyo (JP)

(72) Inventor: Yasuhiro Matsuura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 15/518,338

(22) PCT Filed: Oct. 14, 2015

(86) PCT No.: PCT/JP2015/005201
§ 371 (c)(1),
(2) Date: Apr. 11, 2017

(87) PCT Pub. No.: WO2016/063498
PCT Pub. Date: Apr. 28, 2016

(65) Prior Publication Data
US 2017/0307937 A1    Oct. 26, 2017

(30) Foreign Application Priority Data

Oct. 20, 2014  (JP) .................................. 2014-213766
Jul. 17, 2015  (JP) .................................. 2015-143073

(51) Int. Cl.
*G02F 1/00*    (2006.01)
*G02F 1/1335*  (2006.01)

(52) U.S. Cl.
CPC .. *G02F 1/133603* (2013.01); *G02F 1/133621* (2013.01); *G02F 2001/133601* (2013.01);
(Continued)

(58) Field of Classification Search
CPC .. G02F 1/133602–1/133606; G02F 1/133608; G02F 1/133609; G02F 1/133611
(Continued)

(56) References Cited

U.S. PATENT DOCUMENTS

| | | | |
|---|---|---|---|
| 2007/0030674 A1* | 2/2007 | Kim | G02F 1/133603 362/231 |
| 2008/0030985 A1* | 2/2008 | Jeon | G02F 1/133603 362/231 |

(Continued)

FOREIGN PATENT DOCUMENTS

| | | |
|---|---|---|
| JP | 2007-013007 A | 1/2007 |
| JP | 2007-018996 A | 1/2007 |

(Continued)

OTHER PUBLICATIONS

The US Publications were cited in the International Search Report dated Nov. 17, 2015 of International Application No. PCT/JP2015/005201.

(Continued)

*Primary Examiner* — Evan Dzierzynski
*Assistant Examiner* — Gerald J Sufleta, II
(74) *Attorney, Agent, or Firm* — Cowan, Liebowitz & Latman, P.C.

(57) ABSTRACT

A light source apparatus includes a plurality of light source groups, wherein each light source group has: a plurality of first light sources configured to emit light of a first color; a plurality of second light sources configured to emit light of a second color; and a plurality of third light sources configured to emit light of a third color, and a distance between the plurality of second light sources of the same light source group and a distance between the plurality of third light sources of the same light source group are each shorter than a minimum value of a distance between the plurality of first light sources of the same light source group.

13 Claims, 4 Drawing Sheets

(52) U.S. Cl.
CPC ............ *G02F 2001/133613* (2013.01); *G09G 2230/00* (2013.01); *G09G 2360/145* (2013.01)

(58) Field of Classification Search
USPC .......................................... 362/231, 600–634
See application file for complete search history.

(56) References Cited

U.S. PATENT DOCUMENTS

| | | | | |
|---|---|---|---|---|
| 2009/0268127 | A1* | 10/2009 | Tanaka | G02F 1/133603 349/62 |
| 2009/0296374 | A1* | 12/2009 | Kim | B29D 11/00278 362/97.1 |
| 2012/0307489 | A1* | 12/2012 | Park | G02F 1/133603 362/231 |
| 2014/0307200 | A1* | 10/2014 | Yamashita | G02F 1/133603 349/61 |
| 2016/0033795 | A1* | 2/2016 | Zhang | G09G 3/36 345/690 |

FOREIGN PATENT DOCUMENTS

| | | |
|---|---|---|
| JP | 2008-003220 A | 1/2008 |
| JP | 2008-034361 A | 2/2008 |
| JP | 2008-041666 A | 2/2008 |
| JP | 2011-129371 A | 6/2011 |
| JP | 2011-216271 | 10/2011 |

OTHER PUBLICATIONS

The foreign references 2, 5, 6 and 7 were cited in a May 31, 2016 Japanese Office Action, which is enclosed without an English Translation, that issued in Japanese Patent Application No. 2015-143073.

* cited by examiner

TRI-COLOR LED GROUPS SPACED FOR OPTIMAL COLOR MIXING

CROSS-REFERENCE TO RELATED APPLICATIONS

This application is a national phase application of International Application No. PCT/JP2015/005201 filed on Oct. 14, 2015, the entire disclosure of which is hereby incorporated by reference.

TECHNICAL FIELD

The present invention relates to a light source apparatus and an image display apparatus.

BACKGROUND ART

Cold-cathode fluorescent lamps (CCFL) have been traditionally used as light sources for backlight apparatuses of liquid crystal display apparatuses, but the number of backlight apparatuses using light-emitting diodes (LEDs) as light sources has recently also increased. Since an LED is a spot light source, when LEDs are used as the light sources of a backlight apparatus, the occurrence of brightness unevenness and color unevenness of the light emitted from the backlight apparatus needs to be suppressed by devising the arrangement of LEDs, a light diffusion structure, and a light reflection structure. In particular, in a backlight apparatus using LEDs of a plurality of colors, such as red color, green color, and blue color, brightness unevenness and color unevenness in the form of a stripe or grid pattern occur easier than in the backlight apparatuses using white-color LEDs. Therefore, the arrangement of LEDs, light diffusion structure, and light reflection structure need to be devised.

For example, Patent Literatures 1 to 3 disclose techniques for reducing color unevenness in a backlight apparatus (light source apparatus) using LEDs of three colors: red, green, and blue. Thus, Patent Literatures 1 to 3 disclose light source apparatuses having a plurality of light-emitting clusters.

In the light source apparatus disclosed in Patent Literature 1, light-emitting clusters of a plurality of types are used. In the light-emitting clusters disclosed in Patent Literature 1, the three LEDs have triangular arrangements, and the arrangements of red LEDs differ among the light-emitting clusters of a plurality of types. In the light source apparatus disclosed in Patent Literature 1, the types of the light-emitting clusters which are to be arranged are changed according to the arrangement positions of the light-emitting clusters.

In the light source apparatus disclosed in Patent Literature 2, light-emitting clusters are used which have a plurality of light-emitting elements that differ in color (emission color; the color of light emitted from a light-emitting element) from each other. With respect to at least one color, the light-emitting cluster disclosed in Patent Literature 2 has a plurality of light-emitting elements of this color. Further, in the light-emitting cluster disclosed in Patent Literature 2, the light-emitting elements are arranged such that the central positions of the light-emitting element of each color substantially match.

In the light source apparatus disclosed in Patent Literature 3, light-emitting clusters are used that have N spot light sources that differ in color. Further, in the light source apparatus disclosed in Patent Literature 3, each light-emitting cluster is arranged by being rotated clockwise or counterclockwise through a predetermined angle with respect to a light-emitting cluster adjacent to this light-emitting cluster.

Further, a technique is known by which the emission brightness of LEDs is individually changed by using the fact that LEDs are spot light sources, thereby changing partially the luminance of the backlight apparatus and increasing the contrast of the displayed image. Such control of emission brightness is typically called local dimming control. The local dimming control involves the processing of analyzing a brightness value of an image signal with respect to each of a plurality of divided regions constituting the screen region, and controlling the emission brightness of the corresponding light source on the basis of the analysis results of the brightness value. As a result, the contrast of the displayed image is increased. Further, by using light sources of a plurality of colors as the light sources corresponding to the divided regions, it is possible to change not only the mission brightness of the backlight apparatus but also the emission color for each divided region. More specifically, by changing the emission brightness ratio of light sources of a plurality of colors, it is possible to change the emission color of the backlight apparatus. By controlling the emission color of the backlight apparatus for each divided region, it is possible to expand the color gamut of the displayed image.

For example, Patent Literature 4 discloses the technique for reducing color unevenness in a light source apparatus that can be controlled by local dimming. More specifically, Patent Literature 4 discloses the technique for reducing color unevenness generated at the outer edges of light-emitting clusters. With the technique disclosed in Patent Literature 4, each of a plurality of light source units (light-emitting clusters) corresponding to a plurality of divided regions is constituted by a plurality of red LEDs, a plurality of green LEDs, and a plurality of blue LEDs. The LEDs are arranged such that the following condition is fulfilled for each light source unit.

Condition: the centroid of the brightness profile based on a plurality of red LEDs, the centroid of the brightness profile based on a plurality of green LEDs, and the centroid of the brightness profile based on a plurality of blue LEDs substantially match the centroid of the light source unit.

CITATION LIST

Patent Literature

[PTL 1]
Japanese Patent Application Laid-open No. 2008-034361
[PTL 2]
Japanese Patent Application Laid-open No. 2007-013007
[PTL 3]
Japanese Patent Application Laid-open No. 2008-041666
[PTL 4]
Japanese Patent Application Laid-open No. 2008-003220

SUMMARY OF INVENTION

Technical Problem

The color unevenness occurring in a light source apparatus having a plurality of light-emitting clusters each having LEDs of a plurality of colors will be explained below.

Considered initially is the case in which LEDs of the same color are arranged close to each other between the light-emitting clusters adjacent to each other. In this case, color unevenness in the form of stripe or grid pattern occurs when all of the light-emitting clusters are lit up.

The case in which local dimming control is performed is considered below. In this case, color unevenness occurs between the light-emitting clusters because the emission brightness differs among the light-emitting clusters. More specifically, where the emission brightness differs among the light-emitting clusters, the difference in the emission brightness of a specific color among the light-emitting clusters is perceived as color unevenness.

However, the abovementioned technique disclosed in Patent Literature 1 serves to reduce color unevenness generated at the top, bottom, and corners of the screen when all of the light-emitting clusters emit light with the same emission brightness, and color unevenness occurring during the local dimming control is not taken into consideration in this technique. Therefore, color unevenness occurring during the local dimming control cannot be reduced by using the technique disclosed in Patent Literature 1.

With the technique disclosed in Patent Literature 2, color unevenness occurring during the local dimming control is also not taken into consideration. Therefore, color unevenness occurring during the local dimming control cannot be reduced by using the technique disclosed in Patent Literature 2. Further, with the technique disclosed in Patent Literature 2, LEDs of the same color can be disposed close to each other between the light-emitting clusters which are adjacent to each other, and color unevenness in the form of a stripe pattern or grid pattern can occur.

With the technique disclosed in Patent Literature 3, color unevenness occurring during the local dimming control is also not taken into consideration. Therefore, color unevenness occurring during the local dimming control cannot be reduced by using the technique disclosed in Patent Literature 3. Further, the technique disclosed in Patent Literature 3 serves to reduce color unevenness in the case in which a light-emitting cluster has only one light source of a specific color with respect to each of a plurality of colors. However, when light of white color is obtained by using red LEDs, green LEDs, and blue LEDs, a plurality of green LEDs is used to increase the luminous quantity of the green LEDs. Further, with the technique disclosed in Patent Literature 3, the case in which a light-emitting cluster has a plurality of light sources as a light source of a single color is not taken into consideration.

The technique disclosed in Patent Literature 4 serves to reduce color unevenness occurring because the combination ability (color mixing ability) of light from LEDs of each color in the central portion differs from that at the outer edge, rather than color unevenness occurring during the local dimming control. Therefore, color unevenness occurring during the local dimming control cannot be reduced by using the technique disclosed in Patent Literature 4.

The present invention provides a technique that can more reliably reduce color unevenness of light emitted from a light source apparatus.

Solution to Problem

A light source apparatus according to the present invention includes a plurality of light source groups,
    wherein each light source group has:
    a plurality of first light sources configured to emit light of a first color;
    a plurality of second light sources configured to emit light of a second color with a spectral peak wavelength longer than that of the first color; and
    a plurality of third light sources configured to emit light of a third color with a spectral peak wavelength shorter than that of the first color, and
    a distance between the plurality of second light sources of the same light source group and a distance between the plurality of third light sources of the same light source group are each shorter than a minimum value of a distance between the plurality of first light sources of the same light source group.

An image display apparatus according to the present invention includes:
    a light source apparatus having a plurality of light source groups; and
    a display unit configured to display an image on a screen by modulating light emitted from the light source apparatus,
    wherein each light source group has:
    a plurality of first light sources configured to emit light of a first color;
    a plurality of second light sources configured to emit light of a second color with a spectral peak wavelength longer than that of the first color; and
    a plurality of third light sources configured to emit light of a third color with a spectral peak wavelength shorter than that of the first color, and
    a distance between the plurality of second light sources of the same light source group and a distance between the plurality of third light sources of the same light source group are each shorter than a minimum value of a distance between the plurality of first light sources of the same light source group.

Advantageous Effects of Invention

In accordance with the present invention, color unevenness of light emitted from a light source apparatus can be reduced more reliably.

Further features of the present invention will become apparent from the following description of exemplary embodiments with reference to the attached drawings.

DESCRIPTION OF EMBODIMENTS

<Embodiment 1>

The light source apparatus according to Embodiment 1 of the present invention will be explained below. The light source apparatus according to the present embodiment is a light source apparatus for which local dimming control can be performed. The light source apparatus according to the present embodiment can be used, for example, as a backlight apparatus for a liquid crystal display.

The light source apparatus according to the present embodiment is not limited to the backlight apparatus. The light source apparatus according to the present embodiment can be used in any image display apparatus in which an image is displayed by modulating light emitted from the light source apparatus. For example, the light source apparatus according to the present embodiment can be also used in a display of a MEMS shutter system which uses a MEMS (Micro Electro Mechanical System) shutter instead of a liquid crystal element. The light source apparatus according to the present embodiment can be also used in image display apparatuses such as advertisement and sign apparatuses, and sign display apparatuses. The light source apparatus according to the present embodiment can be also used as an illumination apparatus for street lighting, indoor lighting, microscope illumination, and the like.

(Configuration of the Light Source Device)

The general configuration of the light source apparatus according to the present embodiment will be explained below.

Figure 1:
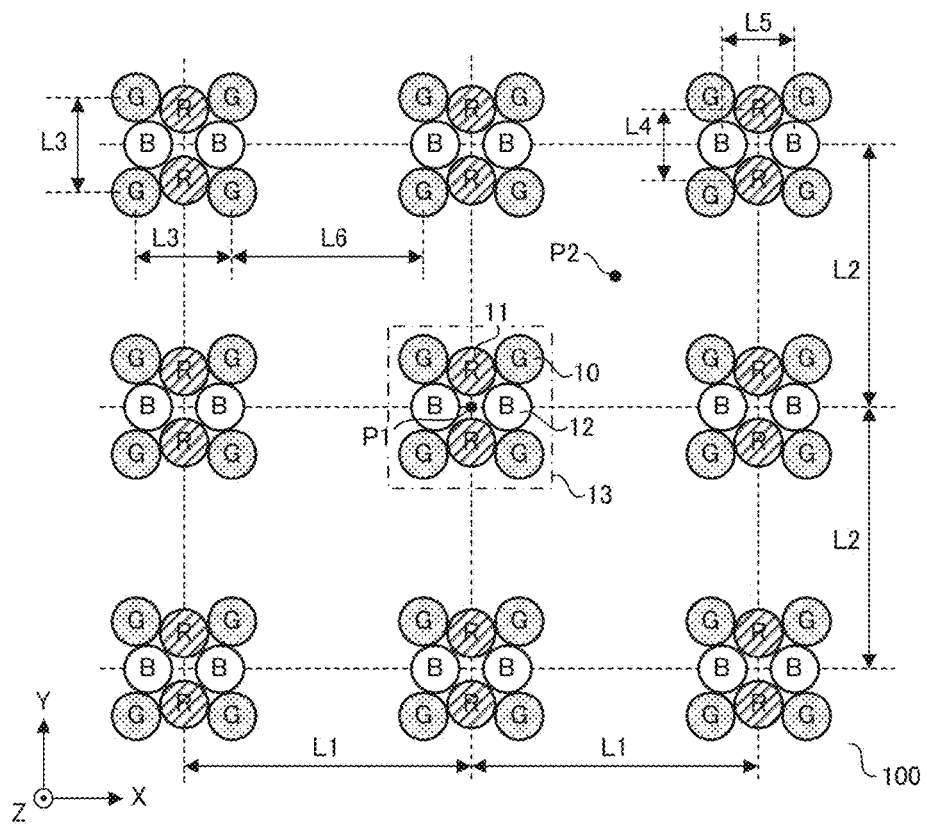
FIG. 1 illustrates an example of the configuration of the light source apparatus according to Embodiment 1.

FIG. 1 illustrates an example of the configuration of a light source apparatus 100 according to the present embodiment. In FIG. 1, an X direction is a horizontal direction of the light source apparatus 100, a Y direction is a vertical direction of the light source apparatus 100, and a Z direction is a height direction of the light source apparatus 100.

As depicted in FIG. 1, the light source apparatus 100 has a plurality of light-emitting clusters 13 arranged as a matrix. In the example depicted in FIG. 1, the light source apparatus 100 has nine light-emitting clusters 13 arranged in three rows and three columns. The light source apparatus 100 also has a diffusion plate and a substrate which are not depicted in FIG. 1.

In the example depicted in FIG. 1, a distance L1 is larger than a distance L2. The distance L1 is a distance in the horizontal direction between a central position (P1) of the light-emitting cluster 13 and a central position of the light-emitting cluster 13 which is adjacent to the aforementioned light-emitting cluster 13 in the horizontal direction. The distance L2 is a distance in the vertical direction between the central position of the light-emitting cluster 13 and the central position of the light-emitting cluster 13 which is adjacent to the aforementioned light-emitting cluster 13 in the vertical direction. Therefore, in the example depicted in FIG. 1, the light emission region (region from which light is emitted) of the light source apparatus 100 has a rectangular shape.

The plurality of light-emitting clusters 13 may be separated from each other, or may be not separated from each other.

The number of the light-emitting clusters 13 is not limited to nine. The number of the light-emitting clusters 13 may be greater or less than nine. For example, a plurality of light-emitting clusters 13 may be four light-emitting clusters 13 arranged in two rows and two columns, sixteen light-emitting clusters 13 arranged in four rows and four columns, and ten light-emitting clusters 13 arranged in two rows and five columns. Further, the plurality of light-emitting clusters 13 may not be arranged as a matrix. For example, the plurality of light-emitting clusters 13 may be arranged in a zigzag configuration.

The magnitude relationship between the distance L1 and the distance L2 is not limited to the abovementioned relationship. For example, the distance L1 may be equal to the distance L2, or the distance L1 may be less than the distance L2.

Each light-emitting cluster 13 is a light source group having a plurality of first light sources, a plurality of second light sources, and a plurality of third light sources. The first light source emits light of a first color. The second light source emits light of a second color with a spectral peak wavelength (main wavelength) longer than that of the first color. The third light source emits light of a third color with a spectral peak wavelength shorter than that of the first color. In the example depicted in FIG. 1, a green LED 10 (G light source) is used as the first light source, a red LED 11 (R light source) is used as the second light source, and a blue LED 12 (B light source) is used as the third light source. Further, in the example depicted in FIG. 1, each light-emitting cluster 13 has four green LEDs 10, two red LEDs 11, and two blue LEDs 12. The green LED 10 is an LED emitting light of green color as the light of the first color. The red LED 11 is an LED emitting light of red color as the light of the second color. The blue LED 12 is an LED emitting light of blue color as the light of the third color. The spectrum of the light emitted by the green LED 10 has a peak (maximum value) in a wavelength range from 490 nm to 559 nm. In other words, the main wavelength range of the light emitted by the green LED 10 is from 490 nm to 559 nm. The main wavelength range of the light emitted by the red LED 11 is from 611 nm to 700 nm. The main wavelength range of the light emitted by the blue LED 12 is from 430 nm to less than 490 nm.

The first color, second color, and third color are not limited to the above-described colors (green, red, and blue). The main wavelength range of each light is not limited to the above-described ranges (the range from 490 nm to 559 nm, the range from 611 nm to 700 nm, and the range from 430 nm to less than 490 nm).

Further, the number of LEDs in each light-emitting cluster 13 is nor particularly limited. For example, the number of green LEDs 10 in the same light-emitting cluster 13 may be greater or less than four. The number of red LEDs 11 in the same light-emitting cluster 13 may be greater or less than two. The number of blue LEDs 12 in the same light-emitting cluster 13 may be greater or less than two.

The light source is not limited to the light-emitting diode (LED). For example, the light source may be a laser diode or an organic EL element.

In the present embodiment, when the local dimming control is performed, the emission brightness of each light-emitting cluster 13 is individually controlled. Further, in the present embodiment, when the local dimming control is performed, the emission brightness of each of a plurality of LEDs in the same light-emitting cluster 13 is controlled such that light of a predetermined color is emitted from the corresponding light-emitting cluster 13. When the predetermined color is white color, for example, the emission brightness of each LED is controlled such that the (emission brightness of the green LED 10):(emission brightness of the red LED 11):(emission brightness of the blue LED 12) ratio is 7:3:1.

In the present embodiment, by using LEDs of a plurality of colors, it is possible to expand the color gamut of the light of the predetermined color with respect to that when a single-color LEDs are used. More specifically, the chromaticity point of the light of the predetermined color can be changed by finely adjusting the ratio of the emission brightness of the green LEDs 10, emission brightness of the red LEDs 11, and the emission brightness of the blue LEDs 12.

The predetermined color may be other than white color.

Where the light source apparatus 100 is for an image display apparatus, the plurality of light-emitting clusters 13 is provided correspondingly to the plurality of divided regions constituting the screen region. For example, the light-emitting clusters 13 are provided such as to emit light on the corresponding divided regions (divided regions corresponding to the light-emitting clusters 13) on the rear surface of the display panel (display portion). More specifically, the light-emitting clusters 13 are provided such that central position P1 of the light-emitting clusters 13 substantially matches the central position of the corresponding divided region. In the present embodiment, "substantially matches" is inclusive of "perfectly matches".

Explained hereinbelow is an example in which a plurality of divided regions arranged as a matrix is obtained. Where the aspect ratio of the screen is 16 (horizontal direction):9 (vertical direction), the screen is divided by a multiple of 16 in the horizontal direction and by a multiple of 9 in the vertical direction, thereby producing square divided regions. The number of the divided regions is determined on the basis, for example, of the contrast required for the image display apparatus.

Regions different from the divided regions (regions of at least part of the screen) may be defined as corresponding regions corresponding to light-emitting clusters. The corresponding regions may be superimposed on other corresponding regions. A plurality of regions that are not in contact with each other may be defined as a plurality of corresponding regions. One corresponding region may be associated with two or more light-emitting clusters. The above-described divided regions can be also referred to as "corresponding regions".

A plurality of corresponding regions is not necessarily arranged as a matrix. For example, a plurality of corresponding regions may be arranged in a zigzag manner.

The size of the light-emitting cluster 13 may or may not be equal to the size of the corresponding region. The size of the light-emitting cluster 13 may be greater or less than the size of the corresponding region.

The shape of the corresponding region may be other than square. For example, the corresponding region may have a quadrangular shape other than square shape (rectangle, parallelogram, trapezoid, etc.), a round shape, a triangular shape, or a pentagonal shape.

A reflective wall with a high light reflectivity may be provided at the outer edge (end portion) of the light source apparatus 100 in order to improve brightness and ability of mixing colors of (ability to combine (mix colors of) light emitted by the green LEDs 10, red LEDs 11, and blue LEDs 12) at the outer edge. Where the light source apparatus 100 is for an image display apparatus, the reflective wall may be provided such as to surround the display region (screen region) of the image display apparatus or a region including the display region (region larger than the display region).

(Arrangement of Light Sources)

The arrangement of light sources according to the present embodiment will be explained hereinbelow.

Initially, the arrangement of green LEDs 10, which are the first light sources, will be explained.

In the example depicted in FIG. 1, the four green LEDs 10 of the same light-emitting cluster 13 are arranged on the outside of other LEDs (red LEDs 11 and blue LEDs 12), when viewed from the central position P1 of the light-emitting cluster. Further, in the example depicted in FIG. 1, the four green LEDs 10 of the same light-emitting cluster 13 are arranged to be substantially point symmetrical with respect to the central position P1 of the light-emitting cluster 13. Furthermore, in the example depicted in FIG. 1, the four green LEDs 10 of the same light-emitting cluster 13 are arranged to form a matrix of two rows and two columns. The row direction of the matrix substantially matches the horizontal direction, and the column direction of the matrix substantially matches the vertical direction. Further, in the example depicted in FIG. 1, the green LEDs 10 are arranged such that the minimum value of the distance between the four green LEDs 10 of the same light-emitting cluster 13 (the minimum value of the distance in the horizontal direction and the minimum value of the distance in the vertical direction) is L3.

Therefore, in the example depicted in FIG. 1, the light-emitting region (the region in which light is emitted) of each light-emitting cluster 13 has a square shape.

Where light of white color is to be obtained as the light emitted from the light-emitting cluster, the green LEDs 10 are light sources emitting light of a brightness higher than that of the light emitted by the red LEDs 11 or blue LEDs 12. By arranging the four green LEDs 10 emitting light of a high brightness such as to obtain a substantially point symmetrical configuration with respect to the central position P1 of the light-emitting cluster 13, it is possible to obtain a brightness distribution with the highest brightness in the central position P1 as the brightness distribution of the light emitted from the light-emitting cluster 13.

Further, in the example depicted in FIG. 1, the distance L3 is shorter than a minimum value L6 of the distance between the green LEDs 10 of the light-emitting cluster 13 and the green LEDs 10 of the light-emitting cluster 13 adjacent to the aforementioned light-emitting cluster 13. Thus, in the example depicted in FIG. 1, the green LEDs 10 are arranged such that the following Conditional Expression 1 is fulfilled.

Distance L3<distance L6     (Conditional Expression 1).

As a result of fulfilling the Conditional Expression 1, it is possible to increase the ability of mixing colors of the light emitted by a plurality of LEDs of the light-emitting cluster 13. As a consequence, the color unevenness (color unevenness in the form of a stripe pattern or grid pattern) of the light emitted by the light source apparatus 100 can be reduced.

In other words, as a result of making the distance L6 longer than the distance L3, it is possible to reduce the number of light-emitting clusters and reduce the total number of LEDs. Therefore, the cost of the light source apparatus or display apparatus can be reduced. Since the color unevenness of the light emitted from the light-emitting cluster 13 can be reduced, even though the distance L6 is thus longer than the distance L3, the color unevenness between the plurality of mutually adjacent light-emitting clusters 13 is also small.

The distance between LEDs may be defined in any way. For example, the distance between the central position of an LED and the central position of an adjacent LED may be used as the distance between the LEDs. The distance between the edge of an LED and the edge of an adjacent LED may be used as the distance between the LEDs. The two edges are, for example, two edges positioned on the same side, or two mutually opposing edges.

The shape of the corresponding region may be other than square. For example, the corresponding region may have a quadrangular shape other than square shape (rectangle, parallelogram, trapezoid, etc.), a round shape, a triangular shape, or a pentagonal shape.

Explained hereinbelow are the arrangement of the red LEDs 11, which are the second light sources, and the arrangement of the blue LEDs 12, which are the third light source.

As follows from the CIE1976UCS chromaticity diagram, in human color vision, the difference in tinge or brightness is perceived easier in the red or blue color than in the green color. Therefore, when the red LEDs 11 or the blue LEDs 12 are arranged at the outer edge of the light-emitting cluster 13, the color of the light emitted by the light-emitting cluster 13 becomes uneven. More specifically, in the central portion of the light-emitting cluster 13, the colors of the light emitted by the green LEDs 10, red LEDs 11, and blue LEDs 12 are mixed sufficiently, and therefore light of a white color can be obtained as the light emitted by the light-emitting cluster 13. Meanwhile, at the outer edge of the light-emitting cluster 13, the color mixing is insufficient, and the light of reddish color or bluish color is obtained as the light emitted by the light-emitting cluster 13. As a result, color unevenness occurs. Such color unevenness becomes more prominent when the emission brightness differs among the light-emitting clusters 13, such as during the local dimming control.

In the present embodiment, the arrangement of the red LEDs 11 and the blue LEDs 12 is devised to also reduce such color unevenness.

In the example depicted in FIG. 1, the two red LEDs 11 of the same light-emitting cluster 13 are arranged to be substantially point symmetrical with respect to the central position P1 of the light-emitting cluster 13. The two blue LEDs 12 of the same light-emitting cluster 13 are also arranged to be substantially point symmetrical with respect to the central position P1 of the light-emitting cluster 13. Further, in the example depicted in FIG. 1, a distance L4 between the two red LEDs 11 of the same light-emitting cluster 13 is shorter than the distance L3, and a distance L5 between the two blue LEDs 12 of the same light-emitting cluster 13 is also shorter than the distance L3. Thus, in the example depicted in FIG. 1, the red LEDs 11 and the blue LEDs 12 are arranged such that the following Conditional Expressions 2 and 3 are fulfilled.

Distance L4<distance L3  (Conditional Expression 2).

Distance L5<distance L3  (Conditional Expression 3).

As a result of arranging the two red LEDs 11 and the two blue LEDs 12 to be substantially point symmetrical with respect to the central position P1 and fulfilling the Conditional Expressions 2 and 3, it is possible to increase further the ability of mixing colors of the light emitted by a plurality of LEDs of the light-emitting cluster 13. As a consequence, even when a variation in emission color or emission brightness occurs among the LEDs of the same color, this variation is unlikely to be perceived. Eventually, the aforementioned color unevenness which becomes prominent during the local dimming control can be reduced.

Since the distances L4 and L5 between the red LEDs and the blue LEDs, for which the difference in tinge or brightness is perceived easier than in the green color in human color vision, are made shorter than the distance L3 between the green LEDs, the effect of the production variation among the red and blue LEDs can be reduced.

Further, in the present embodiment, the two red LEDs 11 of the same light-emitting cluster 13 are arranged side by side in one of the row direction (the horizontal direction) and the column direction (the vertical direction). The two blue LEDs 12 of the same light-emitting cluster 13 are arranged side by side in the other of the row direction and the column direction. In the example depicted in FIG. 1, the two red LEDs 11 of the same light-emitting cluster 13 are arranged side by side in the column direction, and the two blue LEDs 12 of the same light-emitting cluster 13 are arranged side by side in the row direction.

The distance L4 may or may not be equal to the distance L5. The distance L4 may be longer or shorter than the distance L5.

As mentioned hereinabove, in accordance with the present embodiment, the plurality of light sources of the same light-emitting cluster is arranged such that the following three conditions 1 to 3 are fulfilled.

Condition 1: the plurality of first light sources, the plurality of second light sources, and the plurality of third light sources of the same light-emitting cluster are each arranged to be substantially point symmetrical with respect to the central position of the light-emitting cluster.

Condition 2: the minimum value of the distance between the plurality of first light sources of the same light-emitting cluster is shorter than the minimum value of the distance between the first light source of the same light-emitting cluster and the first light source of the light-emitting cluster adjacent to the aforementioned light-emitting cluster.

Condition 3: the distance between the plurality of second light sources of the same light-emitting cluster and the distance between the plurality of third light sources of the same light-emitting cluster are each shorter than the distance between the plurality of first light sources of the same light-emitting cluster.

As a result, the color unevenness of the light emitted by the light source apparatus can be reduced more reliably. More specifically, both the color unevenness in the form of a stripe pattern or grid pattern and the color unevenness which is prominently demonstrated during the local dimming control can be reduced.

The arrangement of the light sources is not particularly limited, provided the conditions 1 to 3 are fulfilled. For example, the row direction and column direction of the matrix formed by the four green LEDs of the same light-emitting cluster may be different from the horizontal direction and vertical direction of the light source apparatus. The two red LEDs of the same light-emitting cluster may be arranged side by side in the row direction of the matrix, and the two blue LEDs of the same light-emitting cluster may be arranged side by side in the column direction of the matrix. The two red LEDs of the same light-emitting cluster may be arranged side by side in a direction different from the above-described row direction, column direction, horizontal direction, and vertical direction. The same is also true with respect to the two blue LEDs of the same light-emitting cluster.

<Embodiment 2>

The light source apparatus according to Embodiment 2 of the present invention will be explained hereinbelow.

In the present embodiment, the configuration, number, arrangement, and the like, of light-emitting clusters of the light source apparatus are the same as in Embodiment 1, and the explanation thereof is herein omitted.

Figure 2:
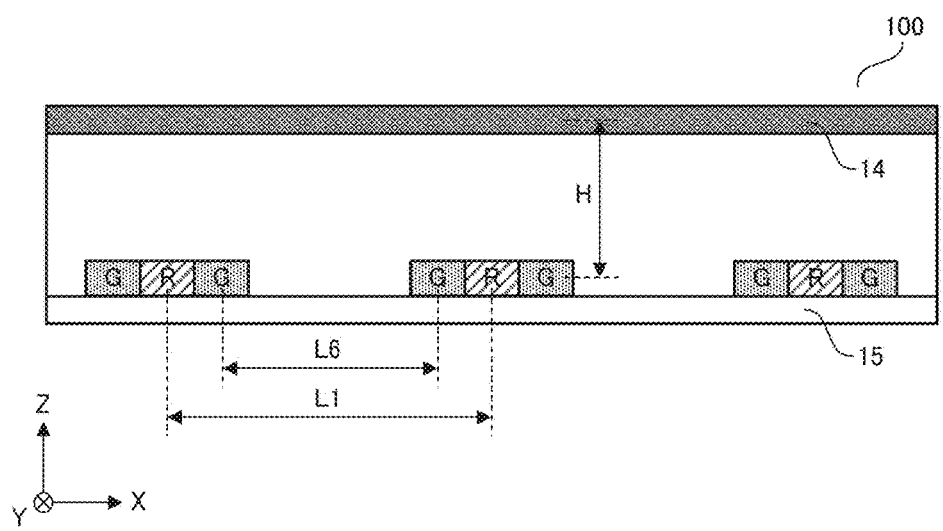
FIG. 2 illustrates an example of the configuration of the light source apparatus according to Embodiment 2.

FIG. 2 is a side view illustrating an example of the configuration of a light source apparatus 200 according to the present embodiment.

As depicted in FIG. 2, the light source apparatus 200 has a plurality of light-emitting clusters 13, a diffusion plate 14, and a substrate 15. In the example depicted in FIG. 2, the plurality of light-emitting clusters 13 is provided on the substrate 15. The substrate 15 is a plate-shaped member with a high light reflectivity. Therefore, the substrate 15 can be also called a "reflective plate". The diffusion plate 14 is a diffusion member that diffuses the light emitted by the plurality of light-emitting cluster 13.

A plate-shaped member with a low light reflectivity may be also used as the substrate 15. However, by using a plate-shaped member with a high light reflectivity as the substrate 15, it is possible to improve the ability of mixing colors of the light emitted from a plurality of LEDs of the light-emitting cluster 13.

The diffusion member is not limited to the plate-like shape.

The diffusion plate 14 is provided at a position opposite the plurality of light-emitting clusters 13. In the example depicted in FIG. 2, a distance H between the central position of the diffusion plate 14 and the central position of the light-emitting cluster 13 (LED) is shorter than the distance L1 and larger than the distance L6. The distance H is the distance in the light emission direction of the light-emitting cluster 13. Further, the distance H is also shorter than the distance L2 (this is not depicted in FIG. 2). Thus, in the example depicted in FIG. 2, the diffusion plate 14 is arranged such that the following Conditional Expression 4 is fulfilled.

Distance L6<distance H<distance L1 and distance L2 (Conditional Expression 4)

By fulfilling the Conditional Expression 4, it is possible to reduce brightness unevenness of the light emitted from the light source apparatus 200. More specifically, by fulfilling the requirement of "distance H<distance L1 and distance L2" of the Conditional Expression 4, it is possible to reduce brightness unevenness of the light emitted from the light source apparatus 200.

The distance H may be shorter than the distance L6.

Figure 3:
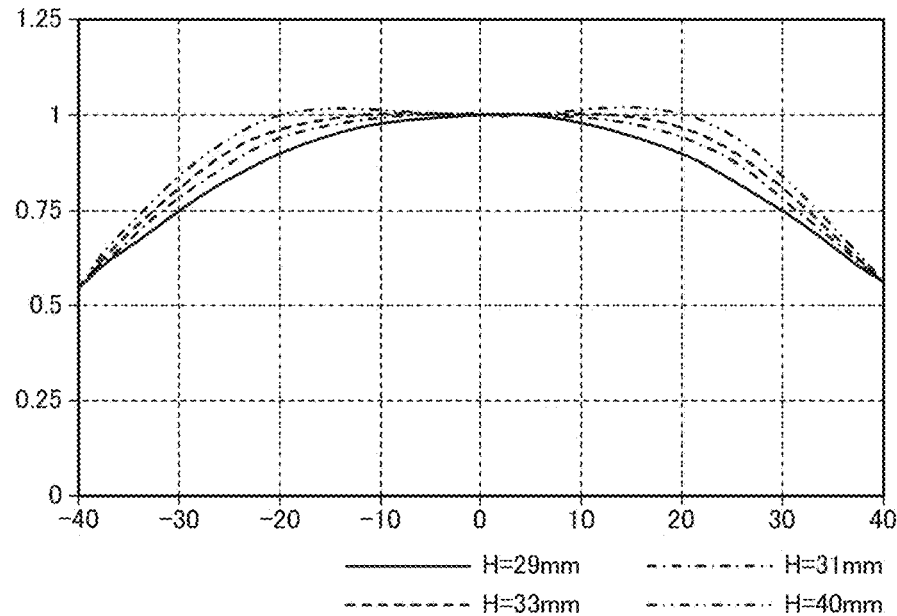
FIG. 3 illustrates an example of the brightness distribution of the light source apparatus according to Embodiment 2.

FIG. 3 illustrates an example of brightness distribution of the light emitted from the light source apparatus 200 (diffusion plate 14). The brightness distribution depicted in FIG. 3 is obtained when four light-emitting clusters 13 arranged around a point P2 in FIG. 1 arte caused to emit light. This brightness distribution relates to the case in which distance L1=distance L2=37 mm and distance L6=26 mm. In FIG. 3, the brightness distribution is depicted with respect to a total of four cases: the case in which the distance H is 29 mm, the case in which the distance H is 31 mm, the case in which the distance H is 33 mm, and the case in which the distance H is 40 mm. A distance from the point P2 in the horizontal direction and vertical direction is plotted against the abscissa in FIG. 3, and the brightness normalized such that the brightness in the point P2 is "1" is plotted against the ordinate in FIG. 3.

As depicted in FIG. 3, when the distance H is 29 mm, 31 mm, and 33 mm, the brightness unevenness is comparatively small. When the distance H is 40 mm, the brightness changes rapidly at a position which is set apart from the point P2. Thus, when the distance H is 40 mm, the brightness unevenness is large. Therefore, it is important to provide the distance H with an upper limit value, and by fulfilling the requirement of "distance H<distance L1 and distance L2", it is possible to reduce the brightness unevenness of light emitted from the light source apparatus 200. Although the optimum lower limit value of the distance H changes depending on the properties of the diffusion plate 14, the allowable brightness unevenness and the like, the distance L6 can be used as the lower limit value of the distance H.

As described hereinabove, according to the present embodiment, the plurality of light sources of the same light-emitting cluster are arranged such that the conditions 1 to 3 described in Embodiment 1 are fulfilled. As a result, the effect same as that described in Embodiment 1 can be obtained. Further, in the present embodiment, the plurality of light-emitting clusters and the diffusion plate are arranged such that the requirement of "distance H<distance L1 and distance L2" is fulfilled. As a result, the brightness unevenness can be also reduced.

The configuration of the light source apparatus according to the present embodiment can be also variously changed in the same manner as in Embodiment 1.

<Embodiment 3>

The light source apparatus according to Embodiment 3 of the present invention will be explained hereinbelow.

Figure 4:
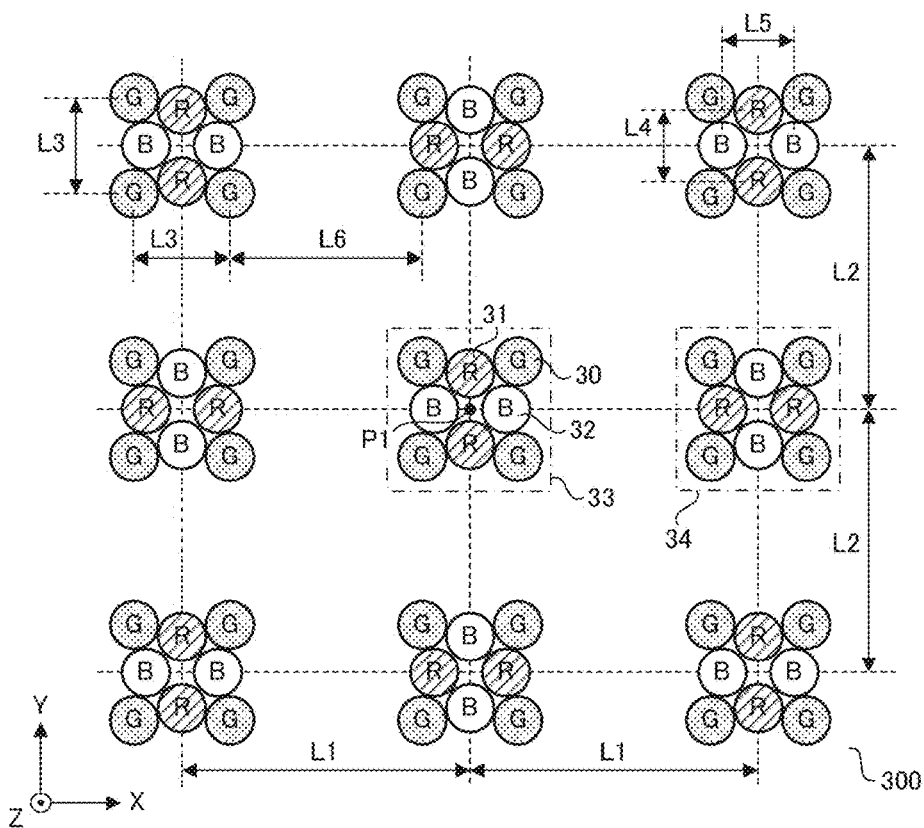
FIG. 4 illustrates an example of the configuration of the light source apparatus according to Embodiment 3.

FIG. 4 illustrates an example of the configuration of a light source apparatus 300 according to the present embodiment.

As depicted in FIG. 4, the light source apparatus 300 has nine light-emitting clusters (five light-emitting clusters 33 and four light-emitting clusters 34). Each light-emitting cluster has four green LEDs 30, two red LEDs 31, and two blue LEDs 32. The arrangement of the light-emitting clusters and the arrangement of the green LEDs 30 are the same as in Embodiment 1. The light source apparatus 300 further includes a diffusion plate and a substrate (not depicted in FIG. 4).

In the example depicted in FIG. 4, the positional relationship between the two red LEDs 31 and the two blue LEDs 32 of the same light-emitting cluster differs among the mutually adjacent light-emitting clusters. More specifically, the light-emitting clusters are arranged such that the light-emitting cluster 33 is adjacent to the light-emitting cluster 34, rather than to another light-emitting cluster 33. In the light-emitting cluster 33, the two red LEDs 31 are arranged side by side in the vertical direction, and the two blue LEDs 32 are arranged side by side in the horizontal direction. In the light-emitting cluster 34, the two red LEDs 31 are arranged side by side in the horizontal direction, and the two blue LEDs 32 are arranged side by side in the vertical direction. Therefore, in the example depicted in FIG. 4, the array directions of the two red LEDs 31 and the two blue LEDs 32 of the same light-emitting cluster are interchanged among the mutually adjacent light-emitting clusters.

With the above-described arrangement, the shortest distance between the red LED 31 and the blue LED 32 in the mutually adjacent light-emitting clusters can be reduced. Therefore, even when color unevenness in the form of a grid pattern or stripe pattern occurs, the color of the grid pattern or stripe pattern becomes a magenta color which is a mixture of red color and blue color. In the color vision of humans, the tinge and brightness of the magenta color is unlikely to be perceived compared with those of the red color or blue color. Therefore, with the above-described arrangement, color unevenness in the form of a grid pattern or stripe pattern can be difficult to recognize visually.

As described hereinabove, according to the present embodiment, the plurality of light sources of the same light-emitting cluster are arranged such that the conditions 1 to 3 described in Embodiment 1 are fulfilled. As a result, the effect same as that described in Embodiment 1 can be obtained. Further, in the present embodiment, the positional relationship of the plurality of second light sources and the plurality of third light sources of the same light-emitting cluster of the same light source group differ among the mutually adjacent clusters. As a result, the color unevenness in the form of a grid pattern or stripe pattern can be difficult to perceive (recognize visually).

The configuration of the light source apparatus according to the present embodiment can be also variously changed in the same manner as in Embodiment 1.

<Embodiment 4>

The light source apparatus according to Embodiment 4 of the present invention will be explained hereinbelow.

(Configuration of the Light Source Device)

The general configuration of the light source apparatus according to the present embodiment will be explained below.

Figure 5:
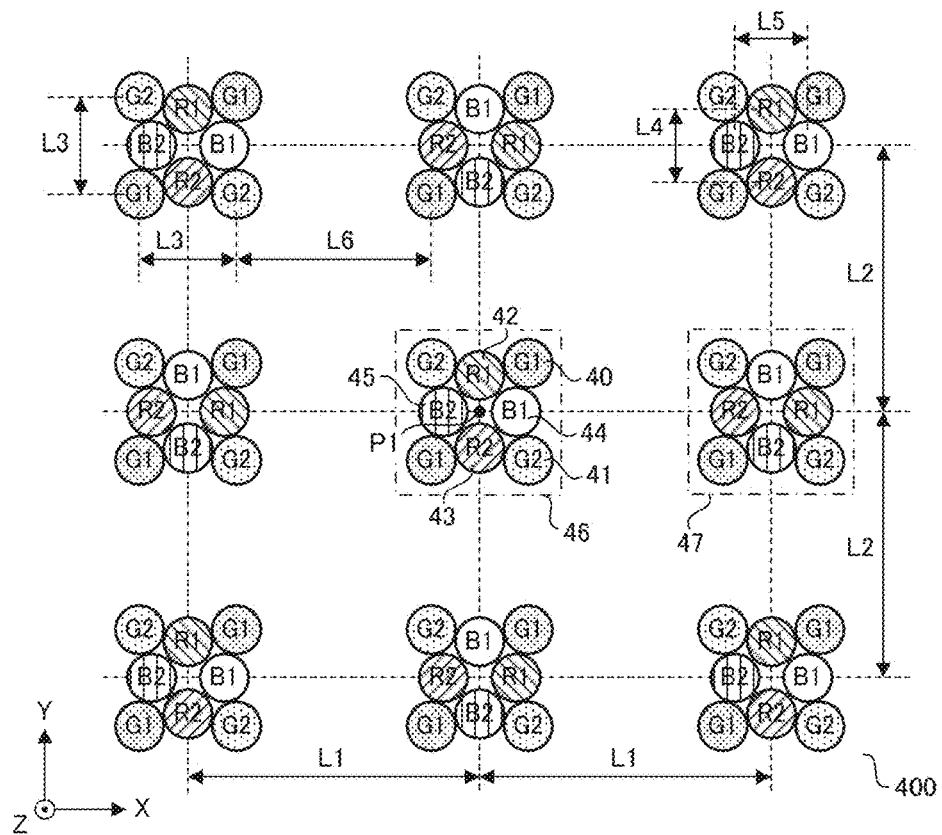
FIG. 5 illustrates an example of the configuration of the light source apparatus according to Embodiment 4.

FIG. 5 illustrates an example of the configuration of a light source apparatus 400 according to the present embodiment.

As depicted in FIG. 5, the light source apparatus 400 has nine light-emitting clusters (five light-emitting clusters 46 and four light-emitting clusters 47). The arrangement of the light-emitting clusters is the same as in Embodiment 1. The light source apparatus 400 further includes a diffusion plate and a substrate (not depicted in FIG. 5).

In the example depicted in FIG. 5, each light-emitting cluster has two first green LEDs 40 (light sources C), two second green LEDs 41 (light sources D), one first red LED 42, one second red LED 43, one first blue LED 44, and one second blue LED 45. In FIG. 5, the first green LED 40 is denoted by "G1", the second green LED 41 is denoted by "G2", the first red LED 42 is denoted by "R1", the second red LED 43 is denoted by "R2", the first blue LED 44 is denoted by "B1", and the second blue LED 45 is denoted by "B2".

The second green LED 41 emits light that differs in the main wavelength from the light emitted by the first green LED 40. For example, the main wavelength of the light emitted by the second green LED 41 is set apart by about 6 nm to 16 nm from the main wavelength of the light emitted by the first green LED 40.

The second red LED 43 emits light that differs in the main wavelength from the light emitted by the first red LED 42. For example, the main wavelength of the light emitted by the second red LED 43 is set apart by about 6 nm to 16 nm from the main wavelength of the light emitted by the first red LED 42.

The second blue LED 45 emits light that differs in the main wavelength from the light emitted by the first blue LED 44. For example, the main wavelength of the light emitted by the second blue LED 45 is set apart by about 6 nm to 16 nm from the main wavelength of the light emitted by the first blue LED 44.

The numbers of the first green LEDs 40, second green LEDs 41, first red LEDs 42, second red LEDs 43, first blue LEDs 44, and second blue LEDs 45 may be larger than the above-described numbers.

In the light-emitting clusters 46, the first red LED 42 and the second red LED 43 are arranged side by side in the vertical direction, and the first blue LED 44 and the second blue LED 45 are arranged side by side in the horizontal direction. In the light-emitting clusters 47, the first red LED 42 and the second red LED 43 are arranged side by side in the horizontal direction, and the first blue LED 44 and the second blue LED 45 are arranged side by side in the vertical direction. The light-emitting clusters are arranged such that the light-emitting cluster 46 is adjacent to the light-emitting cluster 47, rather than to another light-emitting cluster 46.

(Arrangement of the Light Sources)

The arrangement of the light sources according to the present embodiment is explained hereinbelow.

In the example depicted in FIG. 5, the first green LEDs 40 and the second green LEDs 41 of the same light-emitting cluster are arranged to be substantially point symmetrical with respect to the central position P1 of the light-emitting cluster. Among the plurality of green LEDs of the same light-emitting cluster, the green LED which is the closest to the first green LED 40 of the light-emitting cluster adjacent to the aforementioned light-emitting cluster is the second green LED 41. Among the plurality of green LEDs of the same light-emitting cluster, the green LED which is the closest to the second green LED 41 of the light-emitting cluster adjacent to the aforementioned light-emitting cluster is the first green LED 40.

The red LEDs and the blue LEDs are arranged in the same manner as the green LEDs.

In the example depicted in FIG. 5, the first red LEDs 42 and the second red LEDs 43 of the same light-emitting cluster are arranged to be substantially point symmetrical with respect to the central position P1 of the light-emitting cluster. Further, the first blue LEDs 44 and the second blue LEDs 45 of the same light-emitting cluster are arranged to be substantially point symmetrical with respect to the central position P1 of the light-emitting cluster.

Among the plurality of light sources of the same light-emitting cluster, a plurality of light sources of the same color system for which the main wavelengths have been set apart are arranged to be point symmetrical with respect to the central position of the light-emitting cluster, thereby making it possible to improve the ability of mixing colors of the light emitted from the plurality of light sources of the same light-emitting cluster. As a result, color unevenness in the form of a grid pattern or stripe pattern can be reduced. Further, the color mixing ability can be also improved by arranging two light sources of the same color system for which the main wavelengths have been set apart as the two light sources of the same color system which are the closest to each other among the mutually adjacent light-emitting clusters. As a result, color unevenness in the form of a grid pattern or stripe pattern can be reduced.

As mentioned hereinabove, in accordance with the present embodiment, the plurality of light sources of the same light-emitting cluster is arranged such that the conditions 1 to 3 described in Embodiment 1 are fulfilled. As a result, the effect same as that described in Embodiment 1 can be obtained. Further, in accordance with the present embodiment, the second light sources and third light sources are arranged in the positional relationship described in Embodiment 3. As a result, the effect same as that described in Embodiment 3 can be obtained. Further, in accordance with the present embodiment, the plurality of light sources of the same light-emitting cluster is arranged such that the following conditions 4 and 5 are fulfilled.

Condition 4: among the plurality of light sources of the same light-emitting cluster, a plurality of light sources of the same color system for which the main wavelengths have been set apart is arranged to be point symmetrical with respect to the central position of the light-emitting cluster.

Condition 5: two light sources of the same color system for which the main wavelengths have been set apart are arranged as the two light sources of the same color system which are the closest to each other among the mutually adjacent light-emitting clusters.

As a result, color unevenness in the form of a stripe pattern or grid pattern can be reduced.

One of the aforementioned conditions 4 and 5 may not be fulfilled.

Further, in the present embodiment, an example is explained in which the arrangement of the first light sources fulfils the conditions 4 and 5 and the arrangement of the second light sources and third light sources fulfils the condition 4, but such an example is not limiting. For example, when the same light-emitting cluster has a plurality of first red LEDs and a plurality of second red LEDs, the arrangement of the red LEDs (second light sources) may fulfil the conditions 4 and 5. When the same light-emitting cluster has a plurality of first blue LEDs and a plurality of second blue LEDs, the arrangement of the blue LEDs (third light sources) may fulfil the conditions 4 and 5.

The configuration of the light source apparatus according to the present embodiment can be also variously changed in the same manner as in Embodiment 1.

<Embodiment 5>

Figure 6A:
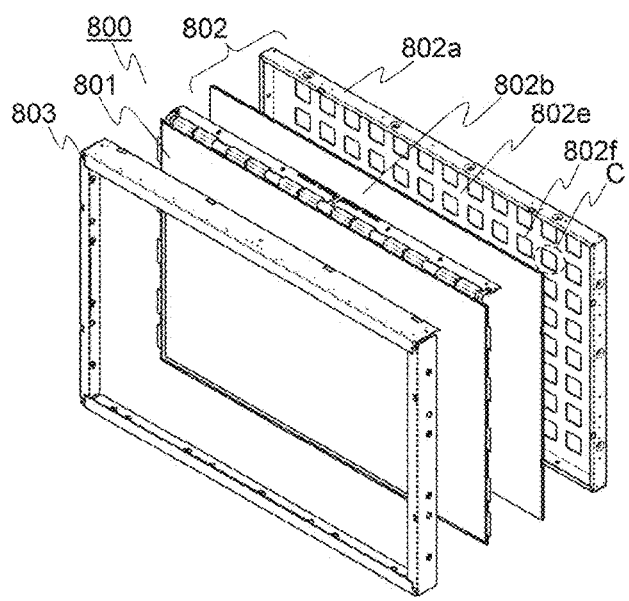
FIG. 6A is an exploded perspective view of the image display apparatus according to Embodiment 5.

An example of the configuration of an image display apparatus 800 according to Embodiment 5 of the present invention will be explained below with reference to FIGS. 6A, 6B, and 6C. FIG. 6A is an exploded perspective view of the image display apparatus 800.

The image display apparatus 800 has a liquid crystal panel 801, a direct-under-type backlight unit 802 (light source apparatus) provided at the rear surface side of the liquid crystal panel 801, and a frame body 803 holding the liquid crystal panel 801 from the display surface side.

The backlight unit 802 is a box-shaped member that is substantially closed by a backlight case 802a that is open at the liquid crystal panel 801 side and an optical sheet group 802b having light transmission, diffusion, or collection ability. A light source substrate 802c having a plurality of LEDs is arranged inside the backlight unit 802 (at the surface of the backlight case 802a facing the optical sheet group 802b). Further, a reflective sheet 802e provided with a through orifice 802f, such that the LEDs of the light source substrate 802c are exposed, is arranged on the light source substrate 802c (optical sheet group 802b side of the light source substrate 802c). Because of the above-described configuration, the backlight unit 802 functions as a surface light source that emits light of uniform brightness and chromaticity within the light emission surface (the surface on the side where the optical sheet group 802b is provided).

Figure 6B:
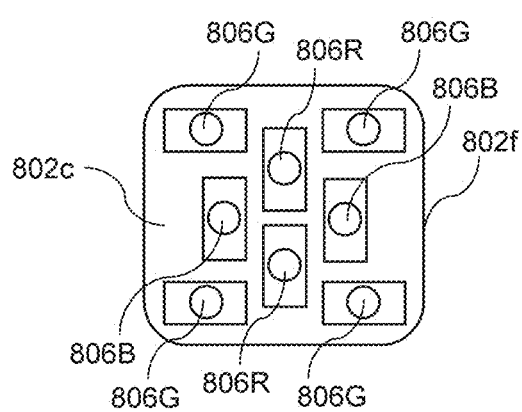
FIG. 6B illustrates an example of the arrangement of light-emitting members and through orifices according to Embodiment 5.

FIG. 6B is an enlarged view of the portion denoted by the reference symbol C in FIG. 6A. More specifically, FIG. 6B illustrates the arrangement of the light-emitting members (light-emitting diodes (LEDs)) and the through orifice 802f of the reflective sheet 802e which promotes reflective diffusion of light from the LEDs.

In the backlight unit 802, the plurality of LEDs emitting light of mutually different peak wavelengths, namely, LEDs 806R, LEDs 806G, and LEDs 806B, are used as a single light-emitting cluster (light source group) for increasing color reproducibility of the light emitted by the backlight unit 802. In the example depicted in FIG. 6B, one light-emitting cluster is constituted by a total of eight LEDs, namely, two LEDs 806R, four LEDs 806G, and two LEDs 806B. In this case, the LEDs 806R, 806G, and 806B are such that a circumscribing quadrangle thereof in the plane parallel to the light emission surface of the light source apparatus (plane parallel to the light source substrate 802c) is a rectangle. In FIG. 6B, the LEDs (LEDs 806R, 806G, and 806B) are represented by rectangles, which are the circumscribing quadrangles thereof, for the sake of simplicity. The LED 806R is an LED emitting red light, the LED 806G is an LED emitting green light, and the LED 806B is an LED emitting blue light.

Further, the plurality of LEDs included in one light-emitting cluster is arranged such that the distance between the LEDs (distance between light emission centers) is small in order to improve uniformity of brightness and chromaticity in the light emission surface of the light emitted by the backlight unit 802.

In the example depicted in FIG. 6B, the LEDs are arranged in the following manner in the plane parallel to the light emission surface of the light source apparatus.

Thus, the LEDs are arranged such that the long sides of each of the four LEDs 806G are parallel to the long sides of the liquid crystal panel 801, and the long sides of the two LEDs 806R and two LEDs 806B are parallel to the short sides of the liquid crystal panel 801.

By arranging the eight LEDs in such a concentrated manner, it is possible to reduce the size of the through orifice 802f of the reflective sheet. Therefore, the reflective surface area (effective surface area) of the reflective sheet can be increased, the light from the LEDs can be used efficiently, and the emission brightness can be increased.

Further, as explained in Embodiment 2, the arrangement of the LEDs 806R and LEDs 806B of the light-emitting cluster adjacent to the light-emitting cluster depicted in FIG. 6B may be interchanged with the arrangement of the LEDs 806R and LEDs 806B of the light-emitting cluster depicted in FIG. 6B (this configuration is not depicted in the figure).

Figure 6C:
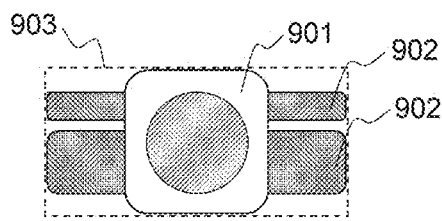
FIG. 6C illustrates an example of the configuration of the light source apparatus according to Embodiment 5.

FIG. 6C illustrates a structural example of each LED. In each LED, a circumscribing quadrangle 903 in the plane perpendicular to the light emission direction (the plane parallel to the light emission surface of the light source apparatus, that is, the plane parallel to the light source substrate 802c) is a rectangle (substantially rectangle). For example, as depicted in FIG. 6C, in an LED having a light-emitting portion 901 of a substantially square shape in the plane perpendicular to the light emission direction and an electrode 902 provided at two ends in one direction perpendicular to the light emission direction (one direction parallel to the light emission surface of the light source apparatus, that is, one direction parallel to the light source substrate 802C), the circumscribing quadrangle 903 in the plane perpendicular to the light emission direction is a rectangle. In the example depicted in FIG. 6C, the circumscribing quadrangle 903 is a rectangle in which the left and right sides are short sides and the top and bottom sides are long sides. When such an LED is used, the through orifice 802f is provided so as to expose the whole LED, rather than only the light-emitting portion of the LED.

The configuration of the light source apparatus according to the present embodiment can be also variously changed in the same manner as in Embodiment 1.

The present invention is also inclusive of a configuration obtained by combining, to the extent possible, the features set forth in the above-described Embodiments 1 to 4. For example, the present invention is also inclusive of a light source apparatus in which, for example, both the arrangement of the diffusion member described in Embodiment 2 and the arrangement of the light sources described in Embodiment 3 are realized. The present invention is also inclusive of a light source apparatus in which both the arrangement of the light sources described in Embodiment 1 and the conditions 4 and 5 described in Embodiment 4 are realized, and a light source apparatus in which both the arrangement of the diffusion member described in Embodiment 2 and the conditions 4 and 5 described in Embodiment 4 are realized. The present invention is also inclusive of a light source apparatus in which both the arrangement of the light sources described in Embodiment 1 and the configuration of the backlight unit described in Embodiment 5 are realized, and a light source apparatus in which both the arrangement of the diffusion member described in Embodiment 2 and the configuration of the backlight unit described in Embodiment 5 are realized. Further, the present invention is also inclusive of a light source apparatus in which both the arrangement of the light sources described in Embodiment 3 and the configuration of the backlight unit described in Embodiment 5 are realized, and a light source apparatus in which both the conditions 4 and 5 described in Embodiment 4 and the configuration of the backlight unit described in Embodiment 5 are realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213766, filed on Oct. 20, 2014, and Japanese Patent Application No. 2015-143073, filed on Jul. 17, 2015, which are hereby incorporated by reference herein in their entirety.

REFERENCE SIGNS 10, 30, 40 and 41: green LED, 11, 31, 42 and 43: red LED, 12, 32, 44 and 45: blue LED, 13, 33, 34, 46 and 47: light-emitting cluster, 100, 200, 300 and 400: light source apparatus

The invention claimed is:

1. A light source apparatus comprising a plurality of light source groups, and a diffusion member configured to diffuse light emitted from the plurality of tight source groups,
wherein each light source group has:
a plurality of first light sources configured to emit light of a first color;
a plurality of second light sources configured to emit light of a second color with a spectral peak wavelength longer than that of the first color; and
a plurality of third light sources configured to emit light of a third color with a spectral peak wavelength shorter than that of the first color,
a distance between the plurality of second light sources of a same light source group and a distance between the plurality of third light sources of the same light source group are each shorter than a minimum value of a distance between the plurality of first light sources of the same light source group,
a distance between the light source group and the diffusion member in a light emission direction of the light source group is shorter than a distance between a central position of the light source group and a central position of a second light source group that is adjacent to the aforementioned light source group, and
the distance between the light source group and the diffusion member in a light emission direction of the light source group is longer than a minimum value of a distance between any of the plurality of first light sources of the light source group and any of the plurality of first light sources of the second light source group that is adjacent to the aforementioned light source group.

2. The light source apparatus according to claim 1, wherein
the minimum value of the distance between the plurality of first light sources of the same light source group is shorter than a minimum value of a distance between any of the plurality of first light sources of the light source group and any of the first light sources of the second light source group that is adjacent to the aforementioned light source group.

3. The light source apparatus according to claim 1, wherein
the plurality of first light sources, the plurality of second light sources, and the plurality of third light sources of the same light source group are each arranged to be point symmetrical with respect to a central position of the same light source group.

4. The light source apparatus according to claim 1, wherein
positional relationships of the plurality of second light sources and the plurality of third light sources of the same light source group differ among mutually adjacent light source groups.

5. A light source apparatus comprising a plurality of light source groups,
wherein each light source group has:
a plurality of first light sources configured to emit light of a first color;
a plurality of second light sources configured to emit light of a second color with a spectral peak wavelength longer than that of the first color; and
a plurality of third light sources configured to emit of a third color with a spectral peak wavelength shorter than that of the first color,
a distance between the plurality of second light sources of a same light source group and a distance between the plurality of third light sources of the same light source group are each shorter than a minimum value of a distance between the plurality of first light sources of the same light source group, and
the plurality of first light sources of the same light source group is composed of one or more light sources C, and one or more light sources D which emit light with a spectral peak wavelength different from that of the light emitted by the light sources C,
among the plurality of first light sources of the same light source group, the first light source which is the closest to one of the light sources C of a second light source group that is adjacent to the aforementioned light source group is one of the light sources D, and
among the plurality of first light sources of the same light source group, the first light source which is the closest to one of the light sources D of a light source group adjacent to the aformentioned light source group is one of the light sources C.

6. A light source apparatus comprising a plurality of light source groups,
wherein each light source group has:
a plurality of first light sources configured to emit light of a first color;
a plurality of second light sources configured to emit light of a second color with a spectral peak wavelength longer than that of the first color; and
a plurality of third light sources configured to emit light of a third color with a spectral peak wavelength shorter than that of the first color,
a distance between the plurality of second light sources of a same light source group and a distance between the plurality of third light sources of the same light source group are each shorter than a minimum value of a distance between the plurality of first light sources of the same light source group, and
the plurality of first light sources of the same light source group is composed of one or more light sources C, and one or more light sources D which emit light with a spectral peak wavelength different from that of the light emitted by the light sources C, and the plurality of light sources C and the plurality of light sources D of the same light source group are each arranged to be point symmetrical with respect to a central position of the same light source group.

7. The light source apparatus according to claim 1, wherein each light source group has four first light sources, two second light sources, and two third light sources.

8. The light source apparatus according to claim 1, wherein each light source group has four first tight sources, two second light sources, and two third light sources, the four first light sources of the same light source group are arranged to form a matrix including two rows and two columns, the two second light sources of the same light source group are arranged side by side in one direction from among a row direction and a column direction of the matrix, and the two third light sources of the same light source group are arranged side by side in the other direction from among the row direction and the column direction.

9. The light source apparatus according to claim 1, wherein the first color is a green color, the second color is a red color, and the third color is a blue color.

10. The light source apparatus according to claim 1, wherein a spectrum of the light of the first color has a peak in a wavelength range from 490 nm to 559 nm, a spectrum of the light of c second color has a peak in a wavelength range from 611 nm to 700 nm, and a spectrum of the light of the third color has a peak in a wavelength range from 430 nm to less than 490.

11. The light source apparatus according to claim 1, wherein the distance between the plurality of second light sources is a distance between a plurality of central positions of the plurality of second light sources, and the distance between the plurality of third light sources is a distance between a plurality of central positions of the plurality of third light sources.

12. The light source apparatus according to claim 2, wherein the distance between the plurality of first light sources is a distance between a plurality of central positions of the plurality of first light sources, and the distance between a first light source of a light source group and a first light source of a light source group adjacent to the aforementioned light source group is a distance between a central portion of a first light source of a light source group and a central portion of a first light source of a light source group adjacent to the aforementioned light source group.

13. An image display apparatus comprising:

a light source apparatus having a plurality of light source groups;

a diffusion member configured to diffuse light emitted from the plurality of light source groups; and a display unit configured to display an image on a screen by modulating light emitted from the light source apparatus, wherein each light source group has:

a plurality of first light sources configured to emit light of a first color;

a plurality of second light sources configured to emit light of a second color with a spectral peak wavelength longer than that of the first color; and a plurality of third light sources configured to emit light of a third color with a spectral peak wavelength shorter than that of the first color, a distance between the plurality of second light sources of a same light source group and a distance between the plurality of third light sources of the same light source group are each shorter than a minimum value of a distance between the plurality of first light sources of the same light source group, a distance between the light source group and the diffusion member in a light emission direction of the light source group is shorter than a distance between a central position of the light source group and a central position of a second light source group that is adjacent to the aforementioned light source group, and a distance between the light source group and the diffusion member in a light emission direction of the light source group is longer than a minimum value of a distance between any of the plurality of first light sources of the light source group and any of the plurality of first light sources of the second light source group that is adjacent to the aforementioned light source group.

* * * * *